United States Patent [19]

Esneault et al.

[11] Patent Number: 5,741,857

[45] Date of Patent: Apr. 21, 1998

[54] BLENDS OF ELASTOMER BLOCK COPOLYMER AND ALIPHATIC α-OLEFIN/ MONOVINYLIDENE AROMATIC MONOMER AND/OR HINDERED ALIPHATIC VINYLIDENE MONOMER INTERPOLYMER

[75] Inventors: Calvin P. Esneault, Baton Rouge, La.; Morris S. Edmondson, Brazoria, Tex.

[73] Assignee: The Dow Chemical Company, Midland, Mich.

[21] Appl. No.: 732,108

[22] Filed: Oct. 15, 1996

[51] Int. Cl.$^6$ .............................. C08L 53/02; C08L 25/04
[52] U.S. Cl. ................................................. 525/97; 525/98
[58] Field of Search ................................ 525/97, 98

[56] References Cited

U.S. PATENT DOCUMENTS

| | | | |
|---|---|---|---|
| 3,424,649 | 1/1969 | Nyberg et al. | 161/253 |
| 3,459,831 | 8/1969 | Luftglass et al. | 260/876 |
| 4,673,711 | 6/1987 | Sharps, Jr. et al. | 525/240 |
| 4,701,367 | 10/1987 | Malhotra et al. | 428/216 |
| 4,778,852 | 10/1988 | Futamura | 525/97 |
| 5,288,762 | 2/1994 | Park et al. | 521/79 |
| 5,340,840 | 8/1994 | Park et al. | 521/60 |
| 5,346,963 | 9/1994 | Hughes et al. | 525/285 |
| 5,460,818 | 10/1995 | Park et al. | 426/415 |

FOREIGN PATENT DOCUMENTS

| | | |
|---|---|---|
| 416815 A2 | 3/1991 | European Pat. Off. . |
| 572990 A2 | 8/1993 | European Pat. Off. . |
| 7/278230 | 10/1995 | Japan . |
| 94/18263 | 8/1994 | WIPO . |
| 95/33006 | 7/1995 | WIPO . |
| 95/32095 | 11/1995 | WIPO . |

OTHER PUBLICATIONS

Derwent Abstract 91–031238.
Derwent Abstract 91–178941.
Chemical Abstracts 108:39427t.
Derwent Abstract 87–345604.
Derwent Abstract 92–110745.
Derwent Abstract 94–186471.
Derwent Abstract 94–300037.
Derwent Abstract 94–279705.
Technical Bulletin SC:165–77.
W.E. Baker et al., "Preliminary Results on Toughening a Linear–Low–Density Polyethylene Using Thermoplastic Elastomers", *Polymer Engineering and Science*, vol. 24, No. 17. pp. 1348–1353 (1984).
R.D. Deanin et al., "Polyblends of Linear–Low–Density Polyethylene with Styrene–Butadiene–Styrene and Styrene–Ethylene/Butylene–Styrene Elastomers", *Antex '90*, pp. 1850–1853.
C. David et al., "Morphology of Polyethylene Blends. II: Formation of a Range of Morphologies in Blends of Polyethylene With Increasing Content of Styrene–Isopropene–Styrene Triblock Copolymers During Extrusion–Blowing", *Polymer Engineering and Science*, vol. 32, No. 1, pp. 6–13 (1992).

D.R. Paul et al., *Polymer Blends*, vol. 2, Ch. 20, pp. 293–317. Academic Press (1978).
"First Technical Details on Some Next–Generation Polyolefins", *Plastics Technology*, Sep. 1992, p. 25.
Kurt W. Swogger, "Applications of Insite* Technology in the Rubber/Elastomer Market", *Worldwide Metallocene Conference MetCon '95*, May 17–19, 1995, Houston, Texas.
"Dow pairs ethylene, styrene", *Plastics News*, Jun. 26, 1995, p. 15.
"Metallocene Catalysts Initiate New Era In Polymer Synthesis", *Chemical & Engineering News*, Sep. 11, 1995, pp. 15–20.
Gerald Lancaster et al., "Applications of Insite* Technology in the Rubber/Elastomer Market", *Proceedings of Fifth International Business Forum on Specialty Polyolefins SPO '95*, Sep. 20–22, 1995, pp. 109–123.
"Dow Plots PP Course", *Chemical Week*, Strategies, Dec. 20/27, 1995, p. 8.
Y.W. Cheung et al., "Structure, Thermal Transitions and Mechanical Properties of Ethylene/Styrene Copolymers", *ANTEC '96*, p. 1634.
C.P. Park et al., "Compatibilization of Polyethylene–Polystyrene Blends with Ethylene–Styrene random Copolymers", *ANTEC '96*, p. 1887.
"Metallocene Technology Drives New Materials", News Update. *Canadian Plastics*, Jan. 1996, vol. 54, No. 1, p. 8.
Metallocenes yield ethylene–styene interpolymers, NEWS-FOCUS, *Plastics Technology*, Jan. 1996, p. 13.
"Dow's plan's for '96: Become force in PP", *Plastics World*, Jan. 1996, pp. 12–13.
Patent Application Entitled "Copolymers of Vinyl Aromatic Monomers and Olefins" filed in the United States of America on Aug. 31, 1989; Application No. 401,345; Applicant: J.C. Stevens, G.F. Schmidt, F.J. Timmers, D.R. Wilson, C–38.099 (Abandoned).
Patent Application Entitled "Constrained Geometry Addition Polymerization Catalysts, Processes for Their Preparation, Precursors Therefor, Methods of Use, and Novel Polymers Formed Therewith" filed in the United States of America on Jul. 3, 1990; Application No. 545,403; Applicant: J.C. Stevens, G.F. Schmidt, F.J. Timmers, D.R. Wilson, P.N. Nickias, S. Lai, G. W. Knight, R.K. Rosen C–38.099–A (Pending).
Patent Application Entitled Pseudo Random Copolymers Formed By Use of Constrained Geometry Addition Polymerization Catalysts: filed in the United States of America on Jun. 6, 1995. Application No. 469,828; Applicant: F.J. Timmers, G.F. Schmidt, J.C. Stevens, D.R. Wilson C–38, 099–B (Allowed).

*Primary Examiner*—David Buttner

[57] ABSTRACT

A thermoplastic elastomeric blend composition comprising: (A) from 99 to 1 weight percent of a styrenic block copolymer; and (B) from 1 to 99 weight percent of an interpolymer of α-olefin and (1) at least one aliphatic α-olefin and (2) at least one vinylidene aromatic monomer or (2) at least one hindered aliphatic vinylidene monomer or (3) a combination of at least one vinylidene aromatic monomer and at least one hindered aliphatic vinylidene monomer, and fabricated articles made from such composition.

14 Claims, No Drawings

BLENDS OF ELASTOMER BLOCK COPOLYMER AND ALIPHATIC α-OLEFIN/MONOVINYLIDENE AROMATIC MONOMER AND/OR HINDERED ALIPHATIC VINYLIDENE MONOMER INTERPOLYMER

BACKGROUND OF THE INVENTION

This invention relates to a thermoplastic elastomeric blend composition comprising an elastomer block copolymer and an α-olefin/monovinylidene aromatic monomer and/or hindered aliphatic vinylidene monomer interpolymer, and to fabricated articles made therefrom.

Elastomer block copolymers of polystyrene and rubber are widely used in the industry, frequently for impact modification of thermoplastic resins and engineering thermoplastics or for compatibilization of different types of resins. The class of elastomer saturated rubber block copolymers, such as styrene-ethylene/butene-styrene block copolymers (S-EB-S), however, is expensive to produce and difficult to process. The class of unsaturated rubber block copolymers such as Styrene-Butadiene-Styrene (SBS) is susceptable to degradation. Blends of polymer components not readily miscible with these block copolymers, such as conventional polyethylenes, can exhibit inferior mechanical properties, especially elastomeric retention such as permanent tensile set after elongation.

It would be desirable to provide either lower cost or more durable blends of these block copolymers by adding a polymeric component that does not significantly decrease the required performance properties. It would be further desirable to provide blends of these block copolymers and a polymeric component thereby maintaining or improving the performance of these block copolymers while providing low haze blends. It would also be desirable to maintain a low value for hardness as desired for applications requiring flexibility such as sheet, film or tubing.

SUMMARY OF THE INVENTION

According to the present invention there is provided a thermoplastic elastomeric blend composition comprising:

(A) from about 99 to about 1 weight percent of at least one styrenic block copolymer; and (B) from about 1 to about 99 weight percent of at least one interpolymer prepared from (1) at least one aliphatic α-olefin and (2) at least one vinylidene aromatic monomer or (2) at least one hindered aliphatic vinylidene monomer or (3) a combination of at least one vinylidene aromatic monomer and at least one hindered aliphatic vinylidene monomer.

In yet another aspect, the present invention provides a fabricated article made from such a thermoplastic elastomeric blend composition.

DETAILED DESCRIPTION OF THE INVENTION

The term "interpolymer" is used herein to indicate a polymer wherein at least two different monomers are polymerized to make the interpolymer.

The term "hydrocarbyl" means any aliphatic, cycloaliphtic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "substantially random" in the substantially random interpolymer comprising an α-olefin and a vinylidene aromatic monomer or hindered aliphatic vinylidene monomer as used herein means that the distribution of the monomers of said interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Suitable unsaturated block copolymers include those represented by the following formulas:

A-B-R(-B-A)$_n$   Formula I or

A$_x$-(BA-)$_y$-BA   Formula II wherein each A is a polymer block comprising a monovinylidene aromatic monomer, preferably styrene, and each B is a polymer block comprising a conjugated diene, preferably isoprene or butadiene, and optionally a monovinylidene aromatic monomer, preferably styrene; R is the remnant of a multifunctional coupling agent; n is an integer from 1 to about 5; x is zero or 1; and y is a real number from zero to about 4.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinylbenzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene, and the like.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers, and the like.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than about 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between about 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of about 5,000 to about 125,000, preferably from about 7,000 to about 60,000 while the rubber monomer block segments will have average molecular weights in the range of about 10,000 to about 300,000, preferably from about 30,000 to about 150,000. The total average molecular weight of the block copolymer is typically in the range of about 25,000 to about 250,000, preferably from about 35,000 to about 200,000.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON™ and supplied by Dexco Polymers under the designation of VECTOR™.

Blend component (B) for the polymer blend composition of the present invention are substantially random interpolymers comprising an aliphatic α-olefin and a vinylidene aromatic monomer.

The aliphatic α-olefin monomers contained in the blend component (B) include aliphatic and cycloaliphatic α-olefins having from 2 to 18 carbon atoms, and preferably α-olefins having from 2 to 8 carbon atoms. Most preferably, the aliphatic α-olefin of blend component (B) comprises ethylene or propylene, preferably ethylene, optionally together with one or more other α-olefins having from 3 to 8 carbon atoms, such as ethylene and propylene, or ethylene and octene, or ethylene and propylene and octene.

The interpolymers suitable for use as component (B) to make the blends comprising the present invention include, but are not limited to, interpolymers prepared by polymerizing one or more α-olefins with one or more vinylidene aromatic monomers and/or one or more hindered aliphatic vinylidene monomers.

Suitable α-olefins include for example, those containing from 2 to about 20, preferably from 2 to about 12, more preferably from 2 to about 8 carbon atoms. Particularly suitable are ethylene, propylene, butene-1, 4-methyl-1-pentene, hexene-1 and octene-1.

Suitable vinylidene aromatic monomers include, for example, those represented by the following formula I:

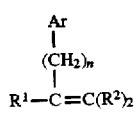

Formula I wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 6, preferably from zero to about 2, more preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl- or phenyl-ring substituted derivatives of styrene, such as ortho-, meta-, and para-methylstyrene, the ring halogenated styrenes, para-vinyl toluene or mixtures thereof, and the like. A more preferred monovinylidene aromatic monomer is styrene.

The term "hindered aliphatic or cycloaliphatic vinylidene monomers" means addition polymerizable vinylidene monomers corresponding to the following formula II:

wherein and $A^1$ is a sterically bulky, aliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and Al together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alky or aryl substituted derivatives thereof, tert-butyl, norbornyl, and the like. Most preferred hindered aliphatic vinylidene compounds are the various isomeric vinyl- ring substituted derivatives of cycloalkene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention as component (B) are substantially random polymers. These interpolymers usually contain from about 1 to about 65, preferably from about 5 to about 60, more preferably from about 10 to about 55 mole percent of at least one vinylidene aromatic monomer and/or hindered aliphatic or cycloaliphatic vinylidene monomer and from about 35 to about 99, preferably from about 40 to about 95, more preferably from about 45 to about 90 mole percent of at least one aliphatic α-olefin having from 2 to about 20 carbon atoms Preferably, higher molecular weight interpolymer component (B) are used, such as those that possess a number average Mw of greater than 13,000. Also preferably such polymers possess a melt index ($I_2$), ASTM D-1238 Procedure A, condition E, of less than 125, more preferably from 0.01-100, even more preferably from 0.01 to 25, and most preferably from 0.05 to 6. Also, the substantially random interpolymers have a heat of fusion of less than 50 J/g.

The present invention provides blends of interpolymer components of molecular weight and composition distributions selected to obtain an overall molecular weight and composition distribution which gives enhanced properties or processability.

While preparing the substantially random interpolymers, component (B), as will be described hereinafter, an amount of atactic vinylidene aromatic homopolymer may be formed due to homopolymerization of the vinylidene aromatic monomer at elevated temperatures. In general, the higher the polymerization temperature was, the higher is the amount of homopolymer formed. The presence of vinylidene aromatic homopolymer is in general not detrimental for the purposes of the present invention and may be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers are prepared by polymerizing a mixture of polymerizable monomers in the presence of metallocene or constrained geometry catalysts.

The substantially random interpolymers can be prepared as described in U.S. application Ser. No. 545,403 filed Jul. 3, 1990 (corresponding to EP-A-0,416,815) by James C. Stevens et al., both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 545,403, filed Jul. 3, 1990 (EP-A-416, 815); U.S. application Ser. No. 702,475, filed May 20, 1991 (EP-A-514,828); U.S. application Ser. No. 876,268, filed May 1, 1992, (EP-A-520,732); U.S. application Ser. No. 241,523, filed May 12, 1994; as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635 all of which patents and applications are incorporated herein by reference.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

The substantially random α-olefin/vinylidene aromatic interpolymers can also be prepared by the methods described in JP 07/278230 employing compounds shown by the general formula

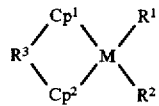

where ($Cp^1$ and $Cp^2$ are cyclopentadienyl groups, indenyl groups, fluorenyl groups, or substituents of these, independently of each other; $R^1$ and $R^2$ are hydrogen toms, halogen atoms, hydrocarbon groups with carbon numbers of 1–12.

alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

Also suitable are the substantially random interpolymers which possess at least one α-olefin/vinyl aromatic/vinyl aromatic/α-olefin tetrad disclosed in a copending application by Francis J. Timmers et al. filed on the same date as this application. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon-13 NMR chemical shifts of these interpolymers, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefininsertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers are prepared by conducting the polymerization at temperatures of from about −30° C. to about 250° C. in the presence of such catalysts as those represented by the formula

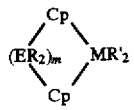

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

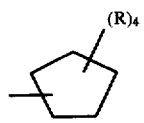

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl))zirconium di-$C_{1-4}$ alkoxide, or any combination thereof and the like.

Further preparative methods for the interpolymer blend component (B) of the present invention have been described in the literature. Longo and Grassi (Makromol. Chem., Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienylti-tanium trichloride (CpTiCl$_3$) to prepare an ethylene-styrene copolymer. Xu and Lin (Polymer Preprints, Am. Chem. Soc.,Div. Polym. Chem.) Volume 35, pages 686,687 [1994]) have reported copolymerization using a TiCl$_4$/NdCl$_3$/Al (iBu)$_3$ catalyst to give random copolymers of styrene and propylene. Lu et al (Journal of Applied Polymer Science, Volume 53, pages 1453 to 1460 [1994]) have described the copolymerization of ethylene and styrene using a TiCl$_4$/NdCl$_3$/MgCl$_2$/Al(Et)$_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer blend components are incorporated herein by reference.

Generally, the blend composition of the present invention comprises from about 1 percent to about 99 percent, by weight of the composition, of the substantially random interpolymer of aliphatic α-olefin/vinylidene aromatic monomer component (B) and from about 99 to about 1 percent, by weight of the composition, of the elastomer block copolymer component (A). Preferably, the composition comprises from about 1 percent to about 50 percent, more preferably from about 10 to about 45 percent, by weight of the composition, of the interpolymer of aliphatic α-olefin/vinylidene aromatic monomer component (B) and from about 99 to about 50 percent, more preferably from about 90 to about 55 percent, by weight of the composition, of the elastomer block copolymer component (A). For the compositions containing at the most about 50 weight percent of interpolymer of aliphatic α-olefin/vinylidene aromatic monomer component (B), the compositions maintain a reasonably low Shore A hardness (about 65 or lower) as well as a fairly constant peak tensile stress, which are desirable properties for elastomeric materials.

Additives such as antioxidants (e.g., hindered phenolics (e.g., Irganox® 1010), phosphites (e.g., Irgafos® 168)), cling additives (e.g., PIB), antiblock additives, colourants, pigments, fillers, and the like can also be included in the present compositions, to the extent that they do not interfere with the enhanced properties discovered by Applicants.

The compositions of the present invention are compounded by any convenient method, including dry blending the individual components and subsequently melt mixing, either directly in the extruder or mill used to make the finished article (e.g., the automotive part), or by pre-melt mixing in a separate extruder or mill (e.g., a Banbury mixer).

There are many types of molding operations which can be used to form useful fabricated articles or parts from the present compositions, including various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference) and profile extrusion. Some of the fabricated articles include sports articles, containers such as for food or other household articles, footware, automotive articles, such as soft facia, sealants and assembly adhesives.

E®, and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added by filling a 70 cc cylinder to a set pressure and then adding it to the reactor to control molecular weight. Temperature in the vessel is controlled to set-point by varying the cooling flow of the cooling coils within the vessel. Prior to polymerization, the vessel is heated to the desired run temperature and the catalyst components :Titanium (N-1,1-dimethylethy)dimethyl(1-(1,2,3,4,5-eta)-2,3,4,5,-tetramethyl-2,4-cyclopentadien-1-yl)silanaminato))(2-)N)-dimethyl, CAS#135072-62-7, Tris(pentafluorophenyl) boron, CAS#001109-15-5, Modified methylaluminoxane Type 3A, CAS# 146905-79-5, are combined in mole ratios as shown and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, about 1,000 ppm of Irganox™ 1010 anti-oxidant is then added to the solution on a polymer basis and the polymer is isolated from the solution by precipitation with methanol. The resulting polymers are dried in a vacuum oven. The following table contains the reactor conditions.

| Sample Number | Solvent gms | Type | Styrene gms | Hydrogen Delta P psig | kPa | Reactor Pressure psi | kPa | Reactor Temp °C. | Polymer Collected grams |
|---|---|---|---|---|---|---|---|---|---|
| E/S — A | 698 | Isopar ®E | 1,222 | 101 | 696 | 150 | 1,034 | 80 | 194 |
| E/S — B | 1123 | cyclohexane | 810 | 403 | 2,779 | 100 | 689 | 60 | 91 |
| E/S — C | 1019 | Isopar ®E | 810 | 301 | 2,075 | 75 | 517 | 60 | 305 |
| E/S — D | 693 | Isopar ®E | 1,217 | 302 | 2,082 | 75 | 517 | 60 | 352 |
| E/S — E | 0 | N/A | 2,002 | 681 | 4,695 | 50 | 345 | 60 | 185 |

| Sample Number | Melt Flow Rate* | Weight % Styrene in Polymer | Catalyst mole ratio Ti/B/Al | Catalyst Efficiency g poly/g Cat |
|---|---|---|---|---|
| E/S — A | 1.77 | 45.3 | 1/3/20 | >200,000 |
| E/S — B | — | 51.8 | 1/1.5/2 | >180,000 |
| E/S — C | 1.84 | 64.1 | 1/3/20 | >200,000 |
| E/S — D | 1.7 | 67.0 | 1/3/20 | >200,000 |
| E/S — E | — | 72.5 | 1/1.5/2 | >180,000 |

*190° C./2.2 kg

The compositions of the present invention can be further combined with many thermoplastic polymers to improve their properties, such as impact properties.

The compositions of the present invention are useful as tubing, tapes, adhesives, film, gaskets, and the like.

The invention will be further illustrated by means of the following examples without limiting the invention thereto.

The properties are obtained by the following procedures. Density is provided by the manufacturer or obtained by ASTM D 792. Wt. Percent Styrene is obtained by $H^1$ NMR.

The following components are employed in the Examples and Comparative Experiments.

GENERAL PROCEDURE FOR PREPARATION OF ETHYLENE/STYRENE COPOLYMERS A–E

Polymer is prepared in a 1 gallon agitated semi-continuous batch reactor. The reaction mixture generally consisted of a solvent comprising cyclohexane or Isopar- ETHYLENE/STYRENE COPOLYMER A (45.3 wt percent; 18.3 mole percent styrene)

See General Procedure. The resulting ethylene/styrene interpolymer had the following properties: weight percent styrene=45.3; mole percent styrene=18.3; density=0.956; melt flow rate (190° C., 2.2 Kg)=1.77; heat of fusion=23.6 J/g; glass transition temperature (DSC derived)=17.2° C.

ETHYLENE/STYRENE COPOLYMER B (51.8 wt percent; 22.5 mole percent styrene)

See General Procedure. The resulting ethylene/styrene interpolymer had the following properties: weight percent styrene=51.8; mole percent styrene=22.5.

ETHYLENE/STYRENE COPOLYMER C (64.1 wt percent; 32.5 mole percent styrene)

See General Procedure. The resulting ethylene/styrene interpolymer had the following properties: weight percent styrene=64.1; mole percent styrene=32.5; density=0.0982; melt flow rate (190° C., 2.2 Kg)=1.84; glass transition temperature (DSC derived)=–4.6° C.

ETHYLENE/STYRENE COPOLYMER D (67.0 wt percent; 35.4 mole percent styrene)

See General Procedure. The resulting ethylene/styrene interpolymer had the following properties: weight percent styrene=67.0; mole percent styrene=35.4; density=0.996; melt flow rate (190° C., 2.2 Kg)=1.7; glass transition temperature (DSC derived)=−3° C.

ETHYLENE/STYRENE COPOLYMER E (72.5 wt percent; 41.6 mole percent styrene)

See General Procedure. The resulting ethylene/styrene interpolymer had the following properties: weight percent styrene=72.5; mole percent styrene=41.6

POLYOLEFIN A is a high density polyethylene available from The Dow Chemical Company as HD 4352N having the following properties: density=0.9508 g/cm$^3$; melt flow rate (200° C./5 kg)=12.4.

POLYOLEFIN B is an ethylene/octene copolymer available from The Dow Chemical Company as DOWLEX® 20474A having the following properties: density=0.9178 g/cms; melt flow rate (200° C./5 kg)=7.2.

BLOCK COPOLYMER A is VECTOR™ 4211-D available from Dexco Polymers which is a Styrene-Isoprene-Styrene block copolymer containing 29.6 wt. percent styrene and 70.4 wt. percent isoprene having the following properties: melt flow rate (200° C./5 kg) of 10.6 g/10 min.

BLOCK COPOLYMER B is VECTOR™ 8508-D available from Dexco Polymers which is a Styrene-Butadiene-Styrene block copolymer containing 28.5 wt. percent styrene and 71.5 wt. percent isoprene having the following properties: melt flow rate (200° C./5 kg) of 12.2 g/10 min.

BLOCK COPOLYMER C is VECTOR™ 7400-D available from Dexco Polymers which is a Styrene-Butadiene-Styrene block copolymer with a molar ratio styrene/butadiene of 31.8/68.2 having the following properties: melt flow rate (200° C./5 kg) of 17.3 g/10 min. and an oil content of 33.3 percent by weight.

BLOCK COPOLYMER D is KRATON™ G 1652 available from Shell Chemical Company which is a styrene-ethylene/butylene-styrene triblock copolymer containing 29 wt. percent styrene and 71 wt. percent ethylene/butylene.

EXAMPLES 1–19 AND COMPARATIVE EXPERIMENTS A–D

A. Preparation of Blend of Component A and Component B.

A compression molding press (PHI Model SB234C-X-MS-X24) is preheated to 175° C.–200° C. A chase system consisting of stainless steel backing plates, TEFLON™ TFE-coated glass film sheets, and a metal chase of approximately 64 mm high by 191 mm wide by 3.18 mm thick is prepared. Into the chase is evenly spread an amount of Block Copolymer pellets (Component A) indicated in Table 1. From a slab of Component (B) is cut an amount of polymer indicated in Table 1 which is evenly distributed in the chase on top of the block polymer. A layered structure with TFE coated sheets is formed next to the polymer. The sandwich is preheated in the press at near minimum pressure for approximately one minute, then pressure of the press is increased to about 20,000 Kg of ram force for 10 seconds. The chase and the fused blend is removed when cooled to sufficient rigidity. The still warm blend is placed onto an operating roll mill (155° C.) for 2 minutes total. The blend is temporarily removed, folded, and replaced on the mill at least twice. The blend is removed from the roll mill and allowed to cool. This material is used for further fabrication.

B. Preparation of Test Sample.

A compression molding press (PHI Model SB234 C-X-MS-X24) is preheated to 200° C. A 7.0 gram portion of the blend from A above is evenly distributed into a 75 mm wide by 115 mm high by 0.94 mm thick chase layered between TFE-coated glass sheets and metal backing plates. The following temperature program is followed: preheat 3.0 minutes at minimal pressure; medium force 0.5 minutes (10,000 Kg ram force); material cure 3.0 minutes (20,000 Kg ram force).

C. Preparation of Test Sample.

A compression molded circle is prepared from another portion of the roll-milled blanket prepared in A above in a manner similar to the first sheet prepared in B above except that 14.0 grams of blend are used in a chase which has 76 mm diameter circles and which is approximately 3.2 mm thick. Circles are cut in half and doubled to required thickness for Shore A testing.

D. Testing of Samples prepared in (B) above.

The test specimens are stored at 23° C. for 24 hours or more prior to testing. Transmission haze is determined on the 0.94 mm sheets prepared in B above using a Hunterlab Tristimulus colorimeter (D25P-9) similar to ASTM D 1003. Tensile, modulus, and set specimens are die cut (Die L, ASTM D 1822) from the 0.94 mm sheets. Tensile set protocol is 150 percent elongation, hold 30 seconds, return, wait 60 seconds, measure percent tensile set, defined as {(final gauge–initial gauge)/(initial gauge)}×100 where gauge is the length between grip jaws when force becomes apparent after removing slack.

Shore A hardness is determined by ASTM D 2240.

Force at 300 percent elongation (300 percent modulus) is determined by ASTM D 412.

Percent relaxation is as defined in ASTM D 2991-84 after extension to 150 percent elongation and is based on force value upon reaching maximum elongation and after 30 seconds.

The test results are provided in Table 1.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Blend # | 6252-5-8 | 6252-5-3 | 6252-5-19 | 6252-5-20 | 6252-5-4 | 6252-5-9 | 6252-5-15 | 6252-5-13 |
| Component B | E/S Copolymer | E/S Copolymer | E/S Copolymer | E/S Copolymer | E/S Copolymer | E/S Copolymer | E/S Copolymer | E/S Copolymer |
| Type | A | A | A | A | B | B | B | B |
| wt. % ethylene | 55 | 55 | 55 | 55 | 48 | 48 | 48 | 48 |
| wt. % styrene | 45 | 45 | 45 | 45 | 52 | 52 | 52 | 52 |
| Amount, grams | 8 | 9 | 19 | 19 | 9 | 8 | 8 | 8 |
| wt. % | 20 | 20 | 50 | 50 | 20 | 20 | 20 | 20 |
| Component A | Block Copolymer | Block Copolymer | Block Copolymer | Block Copolymer | Block Copolymer | Block Copolymer | Block Copolymer | Block Copolymer |
| Type | B | A | B | C | A | B | C | D |
| Amount, grams | 32 | 36 | 19 | 19 | 36 | 32 | 32 | 31 |

TABLE 1-continued

| | | | | | | | | |
|---|---|---|---|---|---|---|---|---|
| wt. % | 80 | 80 | 50 | 50 | 80 | 80 | 80 | 80 |
| % Haze | 23 | 17 | 53 | 60 | 28 | 33 | 65 | 98 |
| Shore A Hardness | 65 | 59 | 62 | 53 | 54 | 63 | 47 | 73 |
| Ultimate Tensile | | | | | | | | |
| psi | 4,398 | 3,163 | 3,147 | 2,560 | 3,437 | 3,978 | 1,603 | 5,154 |
| kPa | 30,323 | 21,808 | 21,698 | 17,651 | 23,697 | 27,427 | 11,052 | 35,536 |
| % Elongation at Break | 850 | 925 | 542 | 758 | 1,017 | 858 | 1,092 | 558 |
| Force at 300% Elongation | | | | | | | | |
| (300% Modulus) | | | | | | | | |
| psi | 635 | 597 | 648 | 395 | 434 | 445 | 597 | 846 |
| kPa | 4,378 | 4,116 | 4,468 | 2,723 | 2,992 | 3,068 | 4,116 | 5,833 |
| % Relaxation | 22 | 21 | 21 | 19 | 20 | 22 | 21 | 17 |
| (after 150% elongation) | | | | | | | | |
| % Set | 11 | 11 | 13 | 13 | 10 | 12 | 13 | 11 |
| (after 150% elongation) | | | | | | | | |

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Blend # | 6252-5-5 | 6252-5-10 | 6252-5-21 | 6252-5-22 | 6252-5-6 | 6252-5-11 | 6252-5-16 | 6252-5-14 |
| Component B | E/S Copolymer | E/S Copolymer | E/S Copolymer | E/S Copolymer | E/S Copolymer | E/S Copolymer | E/S Copolymer | E/S Copolymer |
| Type | C | C | C | C | D | D | D | D |
| wt. % ethylene | 36 | 36 | 36 | 36 | 33 | 33 | 33 | 33 |
| wt. % styrene | 64 | 64 | 64 | 64 | 67 | 67 | 67 | 67 |
| Amount, grams | 8 | 8 | 19 | 19 | 8 | 8 | 8 | 8 |
| wt. % | 20 | 20 | 50 | 50 | 20 | 20 | 20 | 20 |
| Component A | Block Copolymer | Block Copolymer | Block Copolymer | Block Copolymer | Block Copolymer | Block Copolymer | Block Copolymer | Block Copolymer |
| Type | A | B | B | C | A | B | C | D |
| Amount, grams | 32 | 32 | 19 | 19 | 32 | 32 | 31 | 32 |
| wt. % | 80 | 80 | 50 | 50 | 80 | 80 | 79 | 80 |
| % Haze | 73 | 89 | 99 | 99 | 78 | 84 | 99 | 99 |
| Shore A Hardness | 59 | 63 | 47 | 46 | 60 | 66 | 45 | 77 |
| Ultimate Tensile | | | | | | | | |
| psi | 2,958 | 3,745 | 819 | 729 | 2,875 | 3,722 | 1,727 | 5,627 |
| kPa | 20,395 | 25,821 | 5,647 | 5,026 | 19,822 | 25,662 | 11,907 | 38,797 |
| % Elongation at Break | 900 | 742 | 1,000 | 1,050 | 958 | 733 | 983 | 468 |
| Force at 300% Elongation | | | | | | | | |
| (300% Modulus) | | | | | | | | |
| psi | 466 | 648 | 247 | 255 | 613 | 716 | 293 | 1,197 |
| kPa | 3,213 | 4,468 | 1,703 | 1,758 | 4,226 | 4,937 | 2,020 | 8,253 |
| % Relaxation | 20 | 22 | 33 | 33 | 24 | 23 | 18 | 18 |
| (after 150% elongation) | | | | | | | | |
| % Set | 12 | 10 | 18 | 17 | 12 | 12 | 17 | 10 |
| (after 150% elongation) | | | | | | | | |

| | Ex. 17 | Ex. 18 | Ex. 19 | Comp. Expt. A* | Comp. Expt. B* | Comp. Expt. C* | Comp. Expt. |
|---|---|---|---|---|---|---|---|
| Blend # | 6252-5-5 | 6252-5-10 | 6252-5-21 | 6252-5-22 | 6252-5-6 | 6252-5-11 | 6252-5- |
| Component B | E/S Copolymer | E/S Copolymer | E/S Copolymer | Polyolefin | Polyolefin | Polyolefin | Polyolefin |
| Type | E | E | E | A | A | B | B |
| wt. % ethylene | 27 | 27 | 27 | — | — | — | — |
| wt. % styrene | 73 | 73 | 73 | — | — | — | — |
| Amount, grams | 8 | 8 | 19 | 19 | 20 | 19 | 20 |
| wt. % | 20 | 20 | 50 | 50 | 50 | 50 | 50 |
| Component A | Block Copolymer | Block Copolymer | Block Copolymer | Block Copolymer | Block Copolymer | Block Copolymer | Block Copolymer |
| Type | A | B | B | B | C | B | C |
| Amount, grams | 32 | 32 | 19 | 19 | 20 | 19 | 20 |
| wt. % | 80 | 80 | 50 | 50 | 50 | 50 | 50 |
| % Haze | 88 | 83 | 99 | 94 | 93 | 99 | 99 |
| Shore A Hardness | 61 | 66 | 87 | 87 | 89 | 86 | 85 |
| Ultimate Tensile | | | | | | | |
| psi | 3,628 | 3,981 | 2,679 | 3,171 | 2,797 | 2,791 | 2,54 |
| kPa | 25,014 | 27,448 | 18,471 | 21,863 | 19,285 | 19,243 | 17,5 |
| % Elongation at Break | 958 | 783 | 417 | 842 | 750 | 742 | 717 |
| Force at 300% Elongation | | | | | | | |

TABLE 1-continued

| (300% Modulus) | | | | | | | |
|---|---|---|---|---|---|---|---|
| psi | 737 | 814 | 1,856 | 1,736 | 1,693 | 1,192 | 1,18 |
| kPa | 5,081 | 5,612 | 12,797 | 11,969 | 11,673 | 8,219 | 8,13 |
| % Relaxation (after 150% elongation) | 18 | 21 | 59 | 45 | 45 | 30 | 29 |
| % Set (after 150% elongation) | 11 | 12 | 62 | 63 | 59 | 40 | 39 |

*Not an example of the present invention.

What is claimed is:

1. A thermoplastic elastomeric blend composition comprising:
   (A) from 99 to 1 weight percent of a styrenic block copolymer; and
   (B) from 1 to 99 weight percent of an interpolymer containing polymer units derived from (1) at least one aliphatic α-olefin and (2) at least one vinylidene aromatic monomer or an interpolymer containing polymer units derived from (1) and (3) a combination of at least one vinylidene aromatic monomer and at least one hindered aliphatic vinylidene monomer.

2. The composition of claim 1 wherein the elastomer block copolymer component (A) comprises at least one segment of a styrene polymer and at least one segment of the following: isoprene polymer, butadiene polymer, isoprene/butadiene copolymer, ethylene/butylene copolymer or an ethylene/propylene copolymer; and component (B) is an interpolymer containing polymer units derived from ethylene and styrene.

3. The composition of claim 1 wherein the styrenic block copolymer component (A) comprises a polystyrene-polyisoprene-polystyrene or polystyrene-polybutadiene-polystyrene; and component (B) is an interpolymer containing polymer units derived from ethylene and styrene.

4. The composition of claim 1 wherein the styrenic block copolymer component (A) contains from 10 to 35 weight percent of styrenic polymer segments and from 90 to 65 weight percent of elastomeric saturated olefin polymer segments, based on the total weight of the block copolymer; and the interpolymer of an aliphatic α-olefin/vinylidene aromatic monomer; and component (B) is an interpolymer comprising polymer units derived from about 10 to about 55 mole percent of an aliphatic α-olefin and from about 45 to about 90 mole percent of a vinylidene aromatic monomer.

5. The composition of claim 1 wherein the styrenic block copolymer component (A) contains from 10 to 35 weight percent of styrenic polymer segments and from 90 to 65 weight percent of elastomeric unsaturated polydiene segments, based on the total weight of the block copolymer; and the interpolymer of an aliphatic α-olefin/vinylidene aromatic monomer; and component (B) is an interpolymer comprising polymer units derived from about 10 to about 55 mole percent of an aliphatic α-olefin and from about 45 to about 90 mole percent of a vinylidene aromatic monomer.

6. The composition of claim 5 wherein component (B) has a heat of fusion of less than 50 J/g.

7. The composition of claim 5 having a percent tensile set after 150 percent elongation of 15 percent or less and a transmission percent haze of 60 percent or less said haze value being obtained on 0.94 mm thick sample.

8. A fabricated article made from the composition of claim 1.

9. A fabricated article made from the composition of claim 2.

10. A fabricated article made from the composition of claim 3.

11. A fabricated article made from the composition of claim 4.

12. A fabricated article made from the composition of claim 5.

13. A fabricated article made from the composition of claim 6.

14. A fabricated article made from the composition of claim 7.

* * * * *